United States Patent [19]

Biss

[11] 4,447,885

[45] May 8, 1984

[54] APPARATUS AND METHOD FOR MEASURING THE NUMBER AND/OR VALUE OF AN UNKNOWN QUANTITY OF ARTICLES

[75] Inventor: Edgar L. Biss, London, England

[73] Assignee: Perkam Limited, Cardiff, Wales

[21] Appl. No.: 265,326

[22] Filed: May 19, 1981

[30] Foreign Application Priority Data

May 20, 1980 [GB] United Kingdom ................. 8016677
Nov. 11, 1980 [GB] United Kingdom ................. 8036201

[51] Int. Cl.³ ............................................ G01G 19/42
[52] U.S. Cl. ................................. 364/568; 177/25; 364/567; 364/575; 377/8
[58] Field of Search .............. 364/466, 567, 568, 575, 364/582; 377/8, 22; 177/25, 45

[56] References Cited

U.S. PATENT DOCUMENTS 3,716,706  2/1973  Gray .................................... 364/567
3,916,173  10/1975  Williams, Jr. et al. ................ 377/22
4,157,738  6/1979  Nishiguchi et al. .................. 377/22
4,236,222  11/1980  Loshbouch et al. ................. 364/466

Primary Examiner—Errol A. Krass
Attorney, Agent, or Firm—Cushman, Darby & Cushman

[57] ABSTRACT

A load cell weighs an unknown quantity of used bank notes. A micro-processor receives a signal representative of the weight of the notes and processes the weight representative signals to obtain an output signal representing the value of the notes weighed, or generates a warning signal indicating that a reliable value of the notes cannot be derived. The note value or warning is given by a visual display panel. The processing means obtains the output by dividing the total weight of the used notes by the average unit weight of a used note, and comparing the quotient from that division with the nearest whole number to determine whether the quotient differs from the nearest whole number by ±0.35. If the quotient differs from the nearest whole number by less than the ±0.35, the micro-processor multiplies the nearest whole number by the unit value of a note to give the money value of the notes weighed. If the quotient differs from the said nearest whole number by more than ±0.35, the micro-processor generates the warning signal.

30 Claims, 22 Drawing Figures

FIG. 3A `--- 9.59`

FIG. 3B `CAL COIN`

FIG. 3C `CAL 1.00`

FIG. 3D `CAL 20.00`

FIG. 3E `USE BRON`

FIG. 3F `USE SILV`

FIG. 3G `BAG 50P`

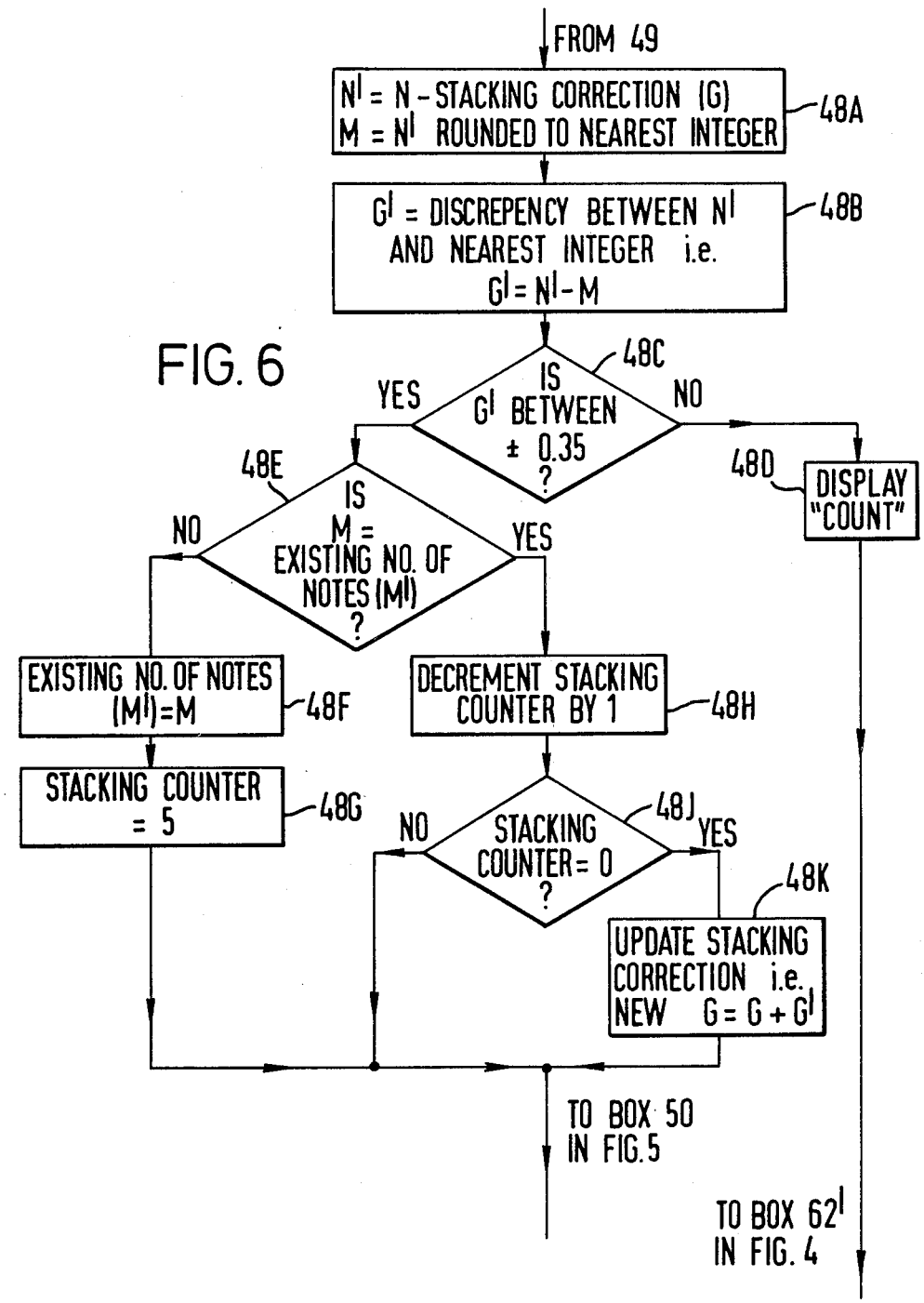

APPARATUS AND METHOD FOR MEASURING THE NUMBER AND/OR VALUE OF AN UNKNOWN QUANTITY OF ARTICLES

The present invention relates to an apparatus for, and method of, measuring the number and/or value of an unknown quantity of articles, and is concerned in particular but not exclusively with the measurement of number and value of used bank notes.

The counting of money manually is slow, boring and frequently inaccurate, and counting by conventional separating machines is expensive, noisy, and unreliable. Bank note counting by means of weighing has been attempted many times but has been rejected principally because no way has previously been developed to overcome the problem of accommodating the difference in weight between new and used money. It has previously been suggested that a simple modifying factor could be used for different states of bank note, but this has not been implemented because of the difficulty of determining what the factors should be and the impossibility of grading notes or mixtures of notes neatly into prescribed factor bands. Previous money weighing machines which have found acceptance are only capable of indicating, and then not with great accuracy, whether or not the money put upon the machine is the amount for which the machine is set up, that is to say for example the checking of standard packs of 100 notes. No machine at present available is capable of stating with acceptable certainty the value of an unknown quantity of bank notes by weighing.

It is also known, in the general art of weighing, to provide a weighing and computing apparatus for counting items of nominally identical weight, although having some distribution of weight variation between them. Such machines make use of weight transducers and computing apparatus such as micro-processors. In use of such a piece counter, a sample consisting of a known number of the articles to be weighed is placed on the weighing machine, which divides the weight of the sample by the number of items in the sample and computes the average weight of the items to be counted. The unknown quantity of items is then placed on the machine, which divides the measured weight by the memorized average unit weight, and then rounds the quotient up or down to the nearest whole number, which whole number is then displayed as the number of items. When there are significant variations in the unit weights within the sample this method can lead to errors, but in many applications these can be accepted.

The counting of bank notes presents a number of specific conditions and requirements which differentiates a bank note counter from a general piece counter or parts counter, and the present invention has particular application to the counting of bank notes.

According to the present invention there is provided apparatus for measuring the number and/or value of an unknown quantity of articles comprising weighing means for weighing an unknown quantity of articles and for generating signals representative of the weight weighed by the weighing means, processing means responsive to signals from the weighing means for dividing the total weight of the weighed articles by an average weight factor related to an average unit weight of the articles which has been previously entered into the apparatus, comparing the actual quotient with the nearest ideal quotient (as hereinafter defined) which could result from the division step, to determine whether the actual quotient differs from the said nearest ideal quotient by more or less than a predetermined deviation, deriving from the said nearest ideal quotient a signal representative of the number and/or value of the quantity of articles weighed, and generating a warning signal if the quotient differs from the said nearest ideal quotient by more than the predetermined deviation, and indicator means connected to an output of the processing means for indicating the information content of output signals of the processing means.

By an ideal quotient is meant a quotient which would result from the division step if the said average weight factor were to be divided into an exact multiple of the said average unit weight.

It will be appreciated that for any particular average weight factor there will be a series of ideal quotients corresponding to supposed division of the average weight factor into the equivalent series of exact multiples of the average weight factor, the multiples being increased by one at each stage of the series. The function required of the processing means is to compare the actual computed quotient with the nearest ideal quotient in this series of ideal quotients.

In a simple form of the apparatus according to the invention, the said average weight factor consists of the actual average unit weight of the articles, and the ideal quotients are whole numbers. The said nearest ideal quotient consists of the nearest whole number to the actual quotient being compared.

Thus in accordance with this simplest form of the invention there is provided apparatus for measuring the number and/or value of an unknown quantity of articles comprising weighing means for weighing an unknown quantity of articles, processing means connected to receive from the weighing means signals representative of the weight weighed by the weighing means, and indicator means connected to an output of the processing means for indicating the information content of output signals of the processing means, the processing means being arranged for performing the steps of dividing the total weight of the weighed articles by an average unit weight of the articles previously entered in the apparatus, comparing the quotient with the nearest whole number to determine whether the quotient differs from the nearest whole number by more or less than a predetermined deviation, deriving from the said whole number a signal representative of the number and/or value of the quantity of articles weighed, and generating a warning signal if the quotient differs from the said nearest whole number by more than the predetermined deviation.

It is to be appreciated that the steps specified to be performed by the processing means in the above simple form of the invention have many variations which have the same effect as the steps specified and which fall within the broader aspect of the invention as set out hereinbefore. For example where it is specified that the computing means is arranged to divide the total weight by an average unit weight and to compare the quotient with the nearest whole number, the same effect can be achieved by, say, dividing the total weight of the weighed articles by half the average unit weight of the articles, and then comparing the quotient with the nearest even whole number to determine whether the quotient differs from the nearest even whole number by more or less than a predetermined deviation, the computing means then being arranged to perform the remainder of the steps of the invention with reference to the said nearest even whole number. In such a case the ideal quotient is any even whole number, and the nearest ideal quotient consists of the nearest even whole number to the quotient. Also in such a case, the said weight factor consists of half the average unit weight of the articles. Clearly in such circumstances the predetermined deviations will be set at twice the value of corresponding deviations which would be used if the quotient were to be obtained by dividing the total weight by the average unit weight.

Another example whereby the same effect can be achieved by different steps of the processing means is by dividing the total weight of the weighed articles by twice the average unit weight of the articles, and then comparing the quotient with the nearest whole number or half whole number to determine whether the quotient differs from the nearest whole number or half whole number by more or less than a predetermined deviation. In such a case the said signal representative of the number and/or value of the quantities of articles weighed would be derived from the said nearest whole number or half whole number, and the said warning signal would be generated if the quotient differs from the said nearest whole number or half whole number by more than the predetermined deviation.

For the sake of simplicity, in the following generalized statements relating to the invention, various features will be referred to with regard to the simple version of the invention set out above where the weight factor consists of the actual average unit weight, and where the ideal quotient consists of a simple whole number. However it is to be appreciated that in all the following statements of invention, whether with regard to apparatus or method aspects of the invention, the features are equally applicable where the weight factor and the ideal quotient are other than as specified in the simple case set out above.

The weighing means may conveniently comprise a platter for receiving the articles to be weighed, coupled to an electrical weight measuring transducer such as a load cell. The processing mean may be constituted by computing means conveniently formed by electronic circuitry, which may be specialized circuitry constructed for the purpose, or may consist of a microprocessor programmed to carry out the various functions set out in the preceding paragraph, and in the remainder of the specification. In this connection it is to be appreciated that where, for example, the computing means comprises a micro-processor, it is usual that many parts of the micro-processor will be utilised at various times in operation to carry out more than one function required in accordance with the invention.

Normally in a preferred form of the apparatus, there will be provided visual indicating means for indicating the number and/or value of the articles being measured, and normally this value will be indicated only when the computing means for comparing the quotient with the nearest whole number has indicated that the quotient is sufficiently close to the nearest whole number to give a reliable output value. It can be arranged if required that the indicator means always indicates a number or value of the articles achieved by rounding the quotient up or down to the nearest whole number, and that the processing means for generating a warning signal operates to indicate that the displayed value is unreliable. However it will normally be preferred that the means for generating the warning signal will act to override the indicator display so that no number or value indication will be given if the difference between the quotient and the nearest whole number is greater than the predetermined deviation.

It is also to be appreciated that there are a number of ways in which the comparison of the quotient with the nearest whole number can be carried out. For example a predetermined deviation may be set, and the warning signal may be given where the difference between the quotient and the nearest whole number is equal to or greater than the predetermined deviation. Alternatively the warning signal can be given only if the difference between the quotient and the nearest whole number exceeds the predetermined deviation. Since the quotient is being compared with the nearest whole number, whether above or below the quotient, the effect of the apparatus according to the invention is to set up a band of uncertainty between adjacent whole numbers such that if the quotient falls into this band a warning signal is given of an unreliable output number or value, but that if the quotient falls outside the band of unreliability, an acceptable output number or value is indicated. Normally the band of uncertainty will be positioned symmetrically between adjacent whole numbers, but it is to be understood that if required the band of uncertainty may be positioned asymmetrically between adjacent whole numbers. In the symmetrical arrangement, the predetermined deviation will be the same above or below a whole number, for example 0.35 above or 0.35 below. In the asymmetrical arrangement, the predetermined deviation will be different above or below a whole number, for example 0.30 above any whole number or 0.40 below a whole number. In both cases this gives a band of uncertainty of 0.30.

There will now be described a number of preferred forms and features of the invention, and in these statements use will be made of the terms setting out the invention in its broader aspect, that is to say reference will be made to the ideal quotient and average weight factor as has been set out hereinbefore.

Preferably the indicator means comprises means for indicating the number and/or value of the quantity of articles weighed as provided by the said signal derived from the said nearest ideal quotient and most preferably the processing means is arranged to actuate the indicator means to indicate the said number and/or value only if the said actual quotient differs from the said nearest ideal quotient by less than the predetermined deviation.

Conveniently the processing means is arranged to generate a signal indicating the value of the quantity of articles weighed by multiplying the said ideal quotient which is nearest to the said actual quotient by a value factor related to the value of each article.

In accordance with a particularly preferred feature of the present invention there may be provided a facility whereby after a first quantity of articles has been measured, a second quantity of articles may be added and may be measured in combination with the first quantity, and the computing means may be arranged to relate the information obtained from the two weighing operations so as to improve the accuracy of the measuring operation in comparison with a single operation of weighing the total combined quantities.

Thus in accordance with a preferred feature of the present invention the processing means includes means for storing information relating to a first unknown quantity of articles weighed for which the said total weight, actual quotient, and deviation have been determined, and the weighing means is adapted to weigh a further total weight of a combination of the first unknown quantity of articles and a second unknown quantity of articles subsequently added to the first quantity, the processing means being arranged for repeating with regard to the combined weight of the first and second quantities of articles the steps carried out with regard to the weight of the first quantity, and being arranged to adjust the items concerned in the quotient comparison so as to remove from the deviation of the new actual quotient from its nearest ideal quotient the effect of the previous deviation of the first actual quotient from its nearest ideal quotient.

The said adjustment of the items concerned in the comparison step can be achieved, for example, by subtracting the weights of the first quantity of articles from the weight of the total combined quantities, and then processing the weight of the second quantity of articles in the manner set out with regard to the first quantity, and then combining two whole numbers obtained for the two quantities. However it is much preferred that the adjustment is effected by adjusting a new quotient obtained by processing the total weight of the combined quantities.

In accordance with this particularly preferred form of the feature, the processing means includes means for storing the said deviation of the first actual quotient from its nearest ideal quotient, and the processing means is arranged for dividing the new total weight of the combined quantities by the said average weight factor, reducing the deviation of the new actual quotient from its nearest ideal quotient by the said stored deviation, comparing the adjusted new actual quotient with its nearest ideal quotient to determine whether the adjusted new actual quotient differs from the nearest ideal quotient by more or less than a predetermined deviation, deriving from the said ideal quotient nearest to the new actual quotient a signal representative of the number and/or value of the total combined quantities of articles weighed, and generating a warning signal if the adjusted new actual quotient differs from its said nearest ideal quotient by more than the predetermined deviation.

The invention has been expressed above in general terms with regard to apparatus for measuring the number and/or value of articles of a general nature, but the invention has particular application where the articles comprise bank notes or like notes, including vouchers, tokens, tickets, or other items made of paper or similar material which experiences a significant change in weight during normal usage.

In accordance with a number of particularly preferred features of the invention, the apparatus may be adapted for measuring the number and/or value of an unknown quantity of articles which have been subjected to use or other modifying process. A particular example of such a situation is where the apparatus is adapted for use in measuring the number and/or value of bank notes or like notes, where the modifying process referred to consists of the gradual variation in weight of the notes because of wear, dirt accretion, tearing, taping, humidity absorption and many other causes.

Thus in accordance with a preferred feature of the present invention, there may be provided apparatus as set out hereinbefore in which the apparatus is adapted for measuring the number and/or value of an unknown quantity of articles which have been subjected to use or other modifying process, and in which the said means for entering the said average weight factor of the articles to be measured comprises means for entering an average weight factor related to an average unit weight of articles of the same type as the articles to be measured but before being subjected to the said modifying process, and means for multiplying the weight factor of the unmodified articles by a modifying factor to give an average weight factor of a modified article.

In general the means for entering the said average unit weight factor into the apparatus (whether dealing with modified or unmodified articles) may comprise a keyboard or otherwise manually operated input means by which an operator can enter a predetermined unit weight into the processing means. However, it is often convenient to enter in the average unit weight factor by weighing on the weighing means a known number of articles, and then operating the processing means to divide the measured weight by the said known number of articles so as to give an average unit weight of the articles weighed. Such an arrangement may conveniently be used in those circumstances where the articles to be used are articles which have been subjected to use or other modifying process.

Thus in accordance with a particularly preferred form of the invention, there may be provided apparatus as set out hereinbefore, in which the apparatus is adapted for measuring the number and/or value of an unknown quantity of articles which have been subjected to use or other modifying process, and in which the said means for entering an average weight factor of articles of the same type as the articles to be measured but before being subjected to the said modifying process comprises means for receiving from the weighing means a signal representing a total weight of a known quantity of articles of the same type as the modified articles but before being subjected to the modifying process, and dividing that total weight by a number related to the said known number of articles to give an average weight factor of the unmodified articles.

It will be appreciated that the above preferred form of the invention is particularly applicable where the apparatus is used for measuring the number and/or value of used bank notes. Such an apparatus can be used by first measuring the weight of a known quantity of unused bank notes or equivalent substitute notes of no value, and then by measuring the weight of an unknown quantity of used bank notes, by operation of the various means set out.

Where the apparatus is adapted for measuring the number and/or value of used bank notes, it is preferred that the said modifying factor may be in the range 1.01 to 1.04. For bank notes of low denomination such as £1 or $1 notes, the factor may be about 1.027. It is also preferred that the said predetermined deviation from the nearest whole number lies in the range 0.3 to 0.4, preferably about 0.35.

There are also provided in accordance with the present invention a number of method aspects.

Thus there is also provided in accordance with the present invention a method of measuring the number and/or value of an unknown quantity of articles by use of a weighing and processing apparatus comprising entering into the weighing and processing apparatus a record of an average weight factor related to an average unit weight of the articles to be measured, weighing an unknown quantity of articles, dividing the total weight of the weighed articles by the said average weight factor, comparing the actual quotient with the nearest ideal quotient (as hereinbefore defined) to determine whether the actual quotient differs from the nearest ideal quotient by more or less than a predetermined deviation, and as a result of the outcome of the comparison step, carrying out at least one of the following steps, namely if the actual quotient differs from the nearest ideal quotient by less than a predetermined deviation, the step of indicating the number and/or value of the quantity of articles weighed by means of a signal derived from the said nearest ideal quotient, and if the actual quotient differs from the nearest ideal quotient by more than the predetermined deviation, the step of indicating a warning that a reliable number and/or value of the quantity of articles weighed cannot be given.

Preferably the said average weight factor comprises the average unit weight of the articles being weighed, the said ideal quotients consist of whole numbers, and the said nearest ideal quotient consists of the nearest whole number to the actual computed quotient.

In accordance with a preferred feature, the method may include the further steps of storing in the weighing and processing apparatus information relating to the said unknown quantity of articles, adding to the said unknown quantity of articles a further unknown quantity of articles, and repeating the weighing and processing steps as set out in the preceding claims, but adjusting the items concerned in the comparison step so as to remove from the deviation of the new actual quotient from its nearest ideal quotient the effect of the previous deviation of the first mentioned actual quotient from its nearest ideal quotient.

Preferably the said further steps comprise storing in the weighing and processing apparatus a record of the said deviation of the first actual quotient from its nearest ideal quotient, adding to the first mentioned unknown quantity of articles the further unknown quantity of articles, weighing the new total unknown quantity of articles, dividing the new total weight by the said average weight factor, reducing the deviation of the new actual quotient from its nearest ideal quotient by the said stored deviation, comparing the adjusted new actual quotient with its nearest ideal quotient to determine whether the adjusted new actual quotient differs from its nearest ideal quotient by more or less than a predetermined deviation, and as a result of the outcome of the comparison step, carrying out at least one of the following steps, namely if the new adjusted actual quotient differs from its nearest ideal quotient by less than a predetermined deviation, the step of deriving from the said ideal quotient nearest the new adjusted actual quotient a signal representative of the number and/or value of the total combined quantities of articles by means of a signal derived from the said nearest ideal quotient, and if the new adjusted actual quotient differs from its nearest ideal quotient by more than the predetermined deviation, the step of indicating a warning that a reliable number and/or value of the total combined quantities of articles cannot be given.

The invention finds particular application where the said unknown quantity of articles consists of an unknown quantity of articles which have been subjected to use or other modifying process, and in such circumstances it is preferred that the step of entering the said average weight factor of the articles to be measured comprises entering an average weight factor of articles of the same type as the modified articles but before being subjected to the said modifying process, and multiplying the average weight factor of the unmodified articles by a modifying factor to give an average weight factor of a modified article.

In accordance with another preferred feature of the invention where the said unknown quantity of articles consists of an unknown quantity of articles which have been subjected to use or other modifying process, the said step of entering an average weight factor of articles of the same type as the articles to be measured but before being subjected to the said modifying process comprises weighing a known quantity of articles of the same type as the modified articles but before being subjected to the modifying process or weighing an item representing such a known quantity, and dividing the total weight of the unmodified articles or representative item by a number related to the said known number of articles to give an average weight factor of unmodified articles.

As has been mentioned the invention is particularly applicable in the measuring of number and/or value of used bank notes, and in accordance with this aspect there is provided a method of measuring the number and/or value of an unknown quantity of used bank notes or like notes by use of a weighing and computing apparatus, comprising the steps of weighing a known quantity of unused bank notes or equivalent substitute notes, dividing the total weight of the unused bank notes by the known number of notes to give a unit weight of an unused note, multiplying the resulting unit weight of an unused note by a modifying factor to give an average unit weight of a used note, weighing an unknown quantity of used notes, dividing the total weight of the used notes by the said average unit weight of a used note, comparing the quotient with the nearest whole number to determine whether the quotient differs from the nearest whole number by more or less than a predetermined deviation, and as a result of the outcome of the comparison step, carrying out at least one of the following steps, namely if the quotient differs from the nearest whole number by less than a predetermined deviation, the step of indicating the number and/or value of the quantity of used notes weighed by means of a signal derived from the said whole number, and if the quotient differs from the nearest whole number by more than the predetermined deviation, the step of indicating a warning that a reliable output number and/or value for the quantity of used notes weighed cannot be given.

In connection with the use of the invention in measuring number and value of bank notes, the preferred feature of the invention by which the average unit weight is entered by weighing a known number of unused bank notes, has a particular advantage in that the weight of bank notes varies from day to day and from location to location according to the humidity of the working area. Thus by calibrating the apparatus by weighing at the beginning of each period of use a known number of actual bank notes or equivalent substitute notes of similar absorbancy as bank notes, there is provided the facility of taking into account changes in humidity which occur. Unless special steps are taken to provide an atmosphere of constant humidity, it is thus preferred that the average unit weight should be entered by weighing a sample quantity of notes, rather than by merely keying into the machine a nominal average unit weight of an unused bank note.

However it is to be appreciated that the main feature of the present invention, in its preferred application in measuring number and value of bank notes, lies in the step of comparing the quotient of the weight of notes divided by the average unit weight with the nearest whole number, in order to utilise the whole number to indicate the count and/or value of money, and/or in order to give a warning if the quotient differs from the nearest whole number by more than the predetermined deviation, together with the optional stacking features set out above for combining a series of quantities of notes. When bank notes are printed and prepared by National Central Banks, the unit weight of the notes is extremely consistent within a period of around six months at a time, which is about the typical total life of a bank note. Once the notes pass into service, variations in weight rapidly arise because of wear, dirt accretion, tearing, taping, humidity absorption and many other causes. Investigation into the weight of large numbers of bank notes has revealed that the general category of used notes of any particular denomination is consistently heavier than new notes of the same denomination, and the ratio of weights is sufficiently consistent, and the deviation in individual used notes from the average used note unit weight is so small, that satisfactory results can be obtained in counting back notes by the weighing system set out above in accordance with the invention.

If, in such use of the invention, all the notes weighed were of the average weight of used notes, the result of computing the quotient of the total weight divided by the average used weight, would be a whole number. Similarly, if there were a normal distribution of variations of weight from the average, a whole number would result. The extent to which the distribution of deviations (in a relatively small sample of, say, under 100 notes) varies from the normal distribution, will cause the quotient to be above or below the correct whole number.

Thus in normal circumstances the quotient will be sufficiently close to the nearest whole number for the apparatus to show a reliable output number or value. Occasionally the warning signal will be given where the distribution of used notes merely happens to be such that the quotient falls outside the "safe" band adjacent to the nearest whole number, and the output signal would have been correct even though the warning was given. In such circumstances the rejection of the count will not cause significant harm, since the quantity of notes concerned will be hand counted. More usually, the warning signal will be given when one or more of the individual notes are grossly overweight (as for example by the addition of adhesive tape) or grossly underweight (as for example by being torn in half). On other occasions the warning signal may be given when a counterfeit note of incorrect weight is included.

Trials on large numbers of notes taken at random have shown that in quantities of up to 100 notes at a time, a band of "rejection" can be selected between each pair of adjacent whole numbers, such that the apparatus will substantially never show a false number of notes counted, but will reject as likely to be false a proportion of counts which are in fact correct. The rejection band can be adjusted to reduce to a minimum the degree of unnecessary rejections, and, as has been mentioned, an optimum value for bank notes indicates that rounding down is permitted below 0.35 above a whole number, and rounding up is permitted above 0.65 over a whole number.

Quotients yielding numbers in the remaining band of rejection or indecision indicate that the notes should be hand counted.

An embodiment of the invention will now be described with reference to the accompanying drawings in which.

Figure 3:
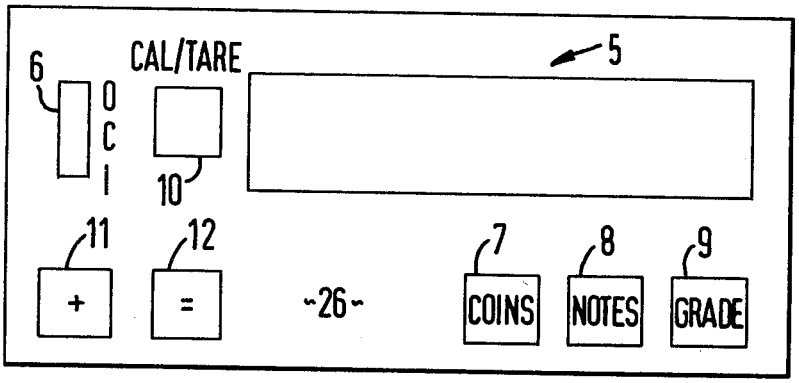
FIG. 3 is a diagrammatic view of the front panel of the apparatus shown in FIG. 1.
Figure 3H:
Figure 3I:
Figure 3J:
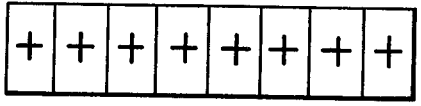
Figure 3K:
Figure 3L:
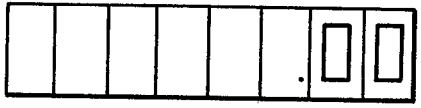
Figure 3M:
Figure 3N:
Figure 3P:
Figure 3Q:
Figure 4:
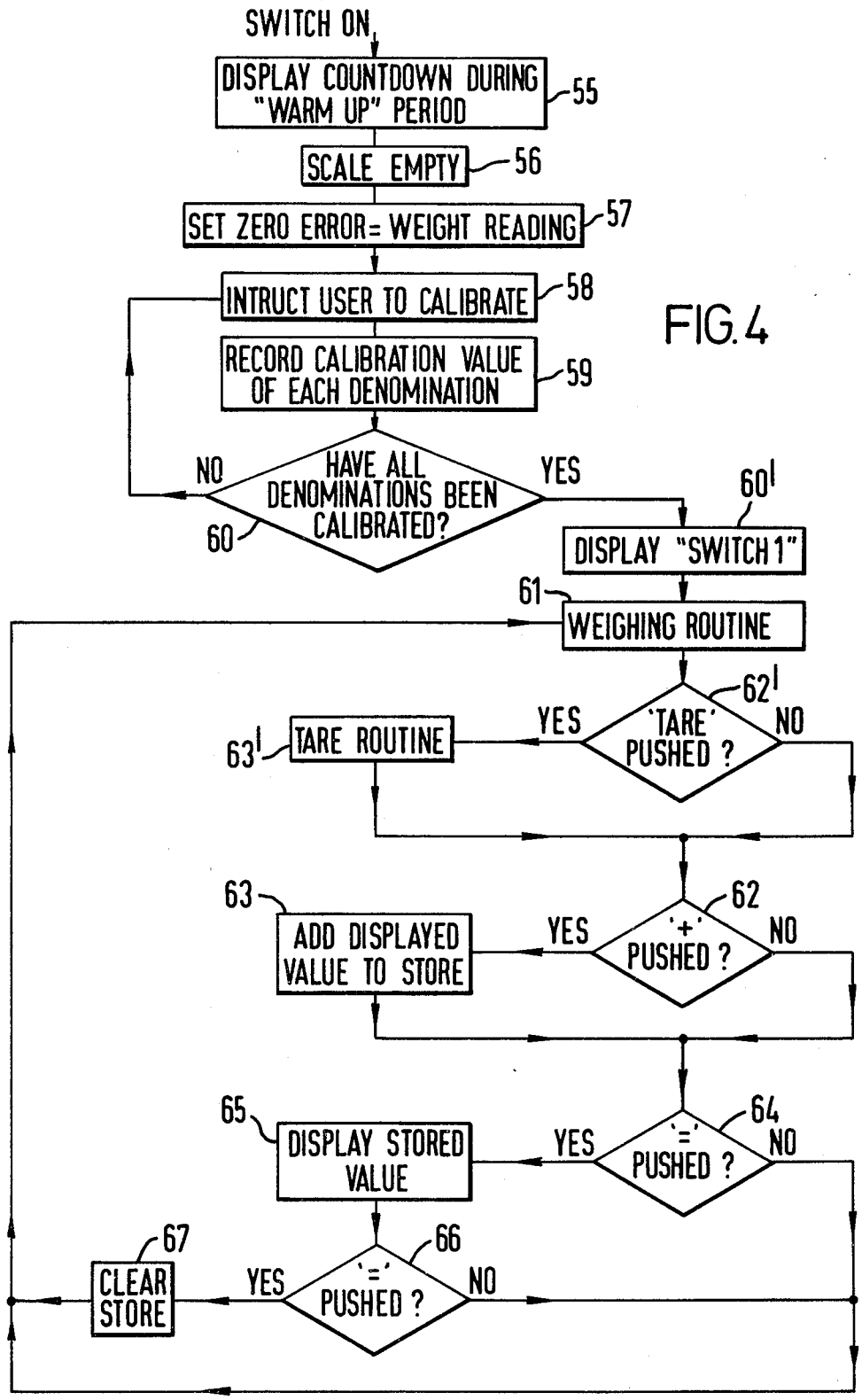
Figure 5:
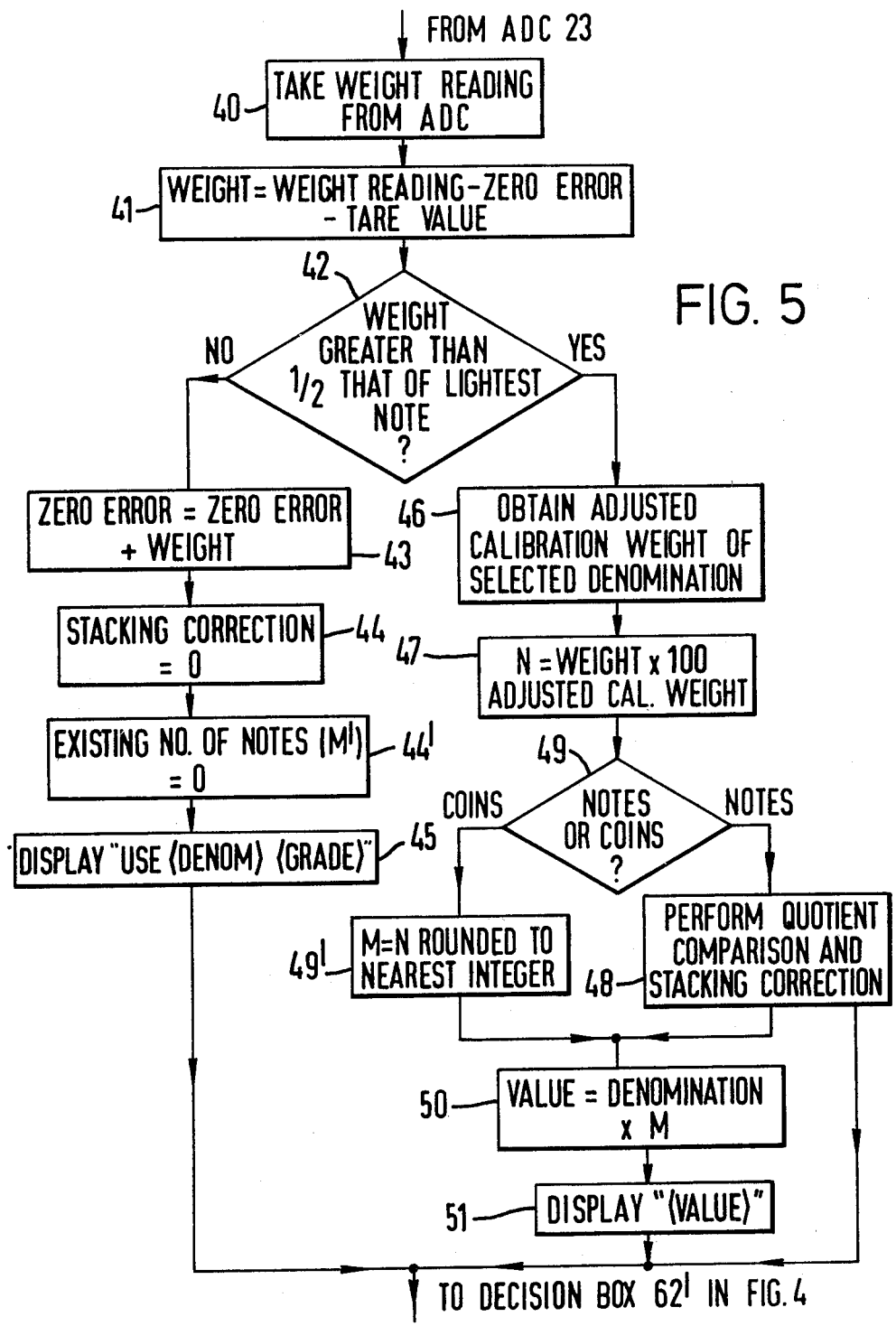

FIGS. 3(A) to 3(Q) show diagrammatically exemplary displays which may be made on a display window of the front panel shown in FIG. 3;

FIG. 4 is an overall flow diagram showing the whole routine of operation of the apparatus, including a calibration routine and a final clearing routine, and also including sub-routines shown in FIGS. 5 and 6;

FIG. 5 is a flow diagram of the main measuring sequence of the apparatus which is referred to as the weighing routine; and FIG. 6 is a flow diagram of a sub-routine of the flow diagram of FIG. 5, and is referred to as the quotient comparison and stacking correction routine.

Figure 1:
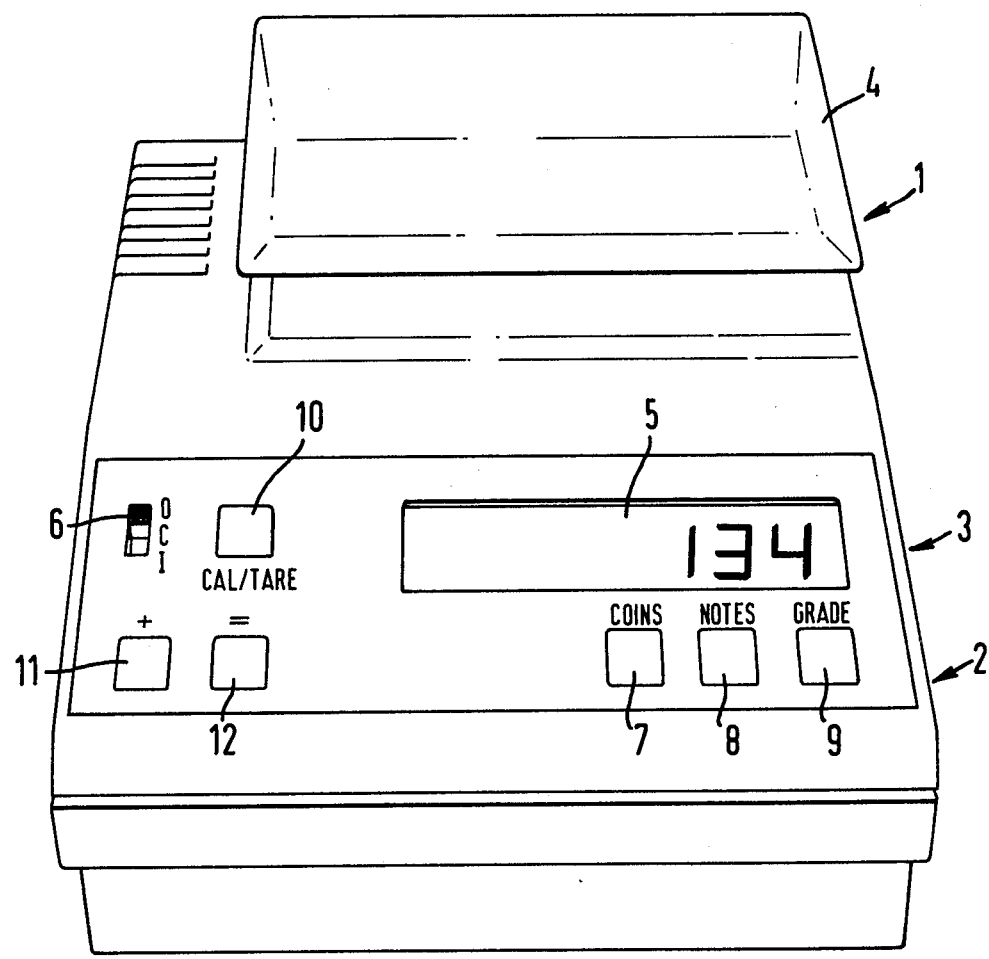
FIG. 1 is a perspective view of apparatus embodying the invention for measuring the number and/or value of bank notes and coins.
Figure 2:
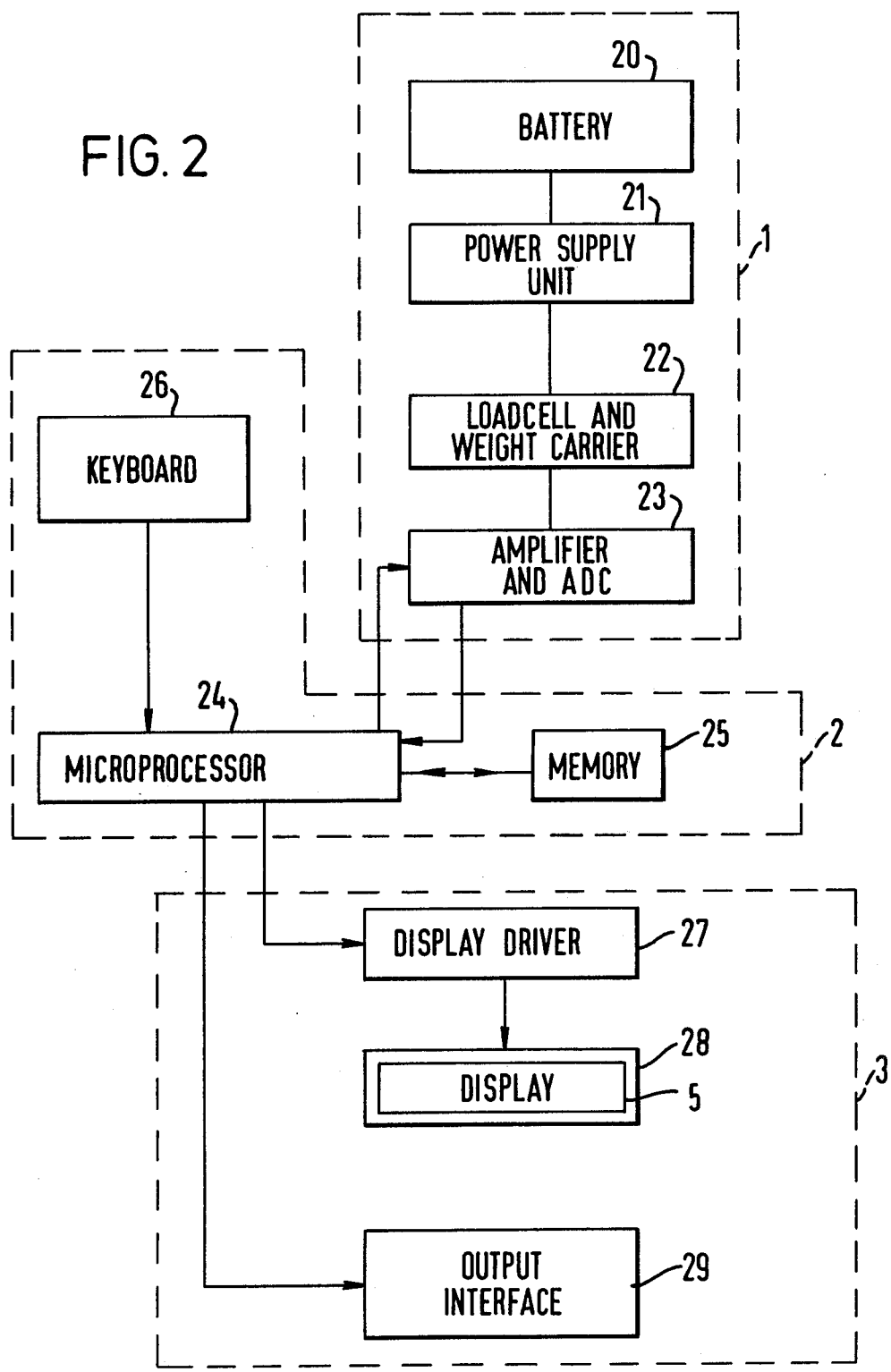
FIG. 2 is a block circuit diagram indicating diagrammatically the main parts of the apparatus shown in FIG. 1.

Referring firstly to FIGS. 1 and 2, measuring apparatus embodying the invention comprises a weighing means indicated generally at 1, a computing means (constituting a processing means) indicated generally at 2, and an indicator means indicated generally at 3.

The weighing means 1 includes a platter 4 to receive notes or coins to be weighed. The weighing means 1 is arranged in known manner to provide electrical output signals which are proportional to weight applied to the platter 4, and the sensitivity should be such that the weighing means is able to discriminate one tenth of the weight of the lightest bank note to be used on it, whilst having an upper limit which will permit an appreciable weight of coin also to be weighed. In FIG. 2, the weighing means 1 is shown as comprising a battery 20 feeding a power supply unit 21 connected across a load cell 22 and an amplifier and analogue to digital converter (ADC) 23.

The computing means 2 is shown in FIG. 2 as consisting of a micro-processor 24 having a memory 25 and input keyboard 26. The indicator means 3 is shown in FIG. 2 as consisting of a display driver unit 27 and a display device 28 having a display window 5 as shown in FIG. 1. Also shown within the indicator means 3 in FIG. 2 is an output interface unit 29 taking an output from the micro-processor 24, and this may provide a facility of printing out or transmitting to an external data processing system various required totals from the micro-processor 24. The micro-processor 24 is shown in FIG. 2 as linked to the amplifier and ADC 23 by an input which receives the weight signal from the weighing means 1, and by an output which sets the gain of the amplifier 23 according to the range selected.

Referring to FIGS. 1 and 3, the exterior of the apparatus includes a front panel which presents the display window 5 and a series of input buttons 7 to 12 for feeding into the micro-processor 24. The group of input buttons 7 to 12 is indicated diagrammatically in FIG. 2 by the keyboard 26. To summarize the operations of the buttons 7 to 12 shown in FIGS. 1 and 3, the button 7 is operable to set the apparatus for use with coins; the button 8 is operable to set the apparatus for use with notes; the button 9 is operable to define whether the notes being weighed are new or used, i.e. to define the grade of the notes; the button 10 is operable when it is desired to calibrate the machine for a category of coins or notes; the button 11 is operable to transfer into the memory of the computing means a value which has been indicated as the value of a quantity of notes or coins weighed; and the button 12 is operable to display the total value stored in the said memory, and also is operable to clear the memory store if required.

Referring next to FIGS. 3(A) to 3(Q), there are shown a number of examples of displays which can be presented on the display window 5 indicating the information content of output signals from the computing means. The display window 5 is divided into 8 segments. All eight segments may be used to display a value of money measured by the apparatus including two segments after the decimal point, and in an example shown in FIG. 3(K) a value of 250 is illustrated.

In FIG. 3(A) there is shown a display indicating the beginning of a ten minute warm-up routine used at the beginning of a days operation.

In FIG. 3(B) the display window 5 shows in the first three digits the letters CAL which is an instruction from the micro-processor 24 for the operator to calibrate the apparatus, as will be described hereinafter. The last four segments show the denomination of notes or coins which the operator is to calibrate, for example coins in FIG. 3(B), 1 notes in FIG. 3(C) and 20 notes in FIG. 3(D). For example, the operator will respond to the display of FIG. 3(B) by placing a 1 Kgm weight on the platter 4 and pressing the CAL button 10.

The display of FIG. 3(E) indicates that the apparatus is ready for use, with nothing on the platter (or pan) 4, and is ready for use with bronze coins. The display shows the legend "USE-BRON". In FIG. 3(F) the display is "USE-SILV", and this indicates that the apparatus is ready for use with silver coins. The display of FIG. 3(G) is "BAG—50P", which indicates that the apparatus is ready for use in a tare mode for 50 p coins. The tare mode is indicated by the display of "BAG" in place of "USE". Similar displays can be provided for other coins, and for notes, in tare modes.

FIGS. 3(I) and 3(J) indicate that the apparatus is arranged for use in a sequence (to be explained in detail hereinafter) in which successive amounts of note or coin can be placed on the pan 4 and can be added in turn to a total stored in the computing means memory. In FIG. 3(H) the display of a single "+" indicates that addition of the amount on the pan is being made for as long as the "+" button 11 is depressed. The display of "++" in FIG. 3(I) is made to effect addition of the "+" button 11 is pressed twice without altering the amount on the pan. The display of FIG. (J) indicates how this procedure can be repeated up to eight depressions of the "+" button 11.

The display of FIG. 3(K) has already been referred to as an example of use of the display digit places for display of a sum of money up to a six digit figure with two decimal places. The particular display of FIG. 3(K) is intended to indicate an accumulated total under the addition sequence mentioned above, indicated so long as the "=" button 12 is depressed. FIG. 3(L) shows a display of "0.00" which indicates that the "=" button 12 has been pressed twice and the accumulator is cleared.

FIG. 3(M) shows a display of "OVERLOAD" which indicates that too much weight has been placed on the pan. FIG. 3(N) shows a display of "BATTERY" which indicates that the battery of the apparatus needs charging.

FIG. 3(P) shows a display of "COUNT" which indicates that the apparatus has carried out the measuring operation according to the invention and has found that it is not possible to give a reliable output value for the money weighed, so that a hand count is necessary.

FIG. 3(Q) shows a display of "SWITCH 1", which indicates that the calibration routine mentioned above is complete and that the switch 6 should be moved to the "1" position for normal operation, as will be described hereinafter.

If required, the display panel 5 can be arranged also to indicate a reminder display showing which grade of notes has been selected by operation of button 9.

There will now be described the general operation of the apparatus as conducted by an operator in normal use. Reference wil be made to the figures already described, and also to the overall flow chart of FIG. 4. The particular sub-routines for weighing, as shown in the flow charts of FIGS. 5 and 6, will be described in more detail hereinafter. In the two flow diagrams of FIGS. 4 and 5, the square boxes represent actions taken by the micro-processor in response to inputs from the keyboard 26 or in response to decisions made in the flow chart. The diamond shaped blocks represent decisions to be made by answering a question having a YES or NO answer, in accordance with conventional computer techniques.

Referring to FIG. 4, the operator first switches on the apparatus by switching the switch 6 to the "C" position (FIGS. 1 and 3), and the micro-processor 24 then initiates an automatic start-up sequence which has a duration of approximately ten minutes. During this sequence, which is of a conventional computer nature, a series of auto-diagnostic procedures are carried out to bring the apparatus into the operational mode. The start-up sequence block is indicated at 55, and in the block 56 there is indicated the condition of the apparatus at the end of the start-up sequence, i.e. with the scale platform 4 empty. The weighing means 1 then feeds the output weight with the scale empty into the micro-processor 24 as shown at the block 57, and the weight reading in this condition is utilised to set the zero error. Next, as at block 58, the micro-processor instructs the operator to calibrate the apparatus, and this is achieved by presenting the display shown in FIGS. 3(B) and 3(D). The display of CAL "20" instructs the operator to place a standard quantity of 100 new 20 notes onto the scale and to press the calibration button 10 to feed in the weight of the standard 20 notes into the microprocessor 24. The apparatus is calibrated for coins by the operator placing on the pan a standard weight, such as 1 Kg, to represent a predetermined number of coins of the denomination concerned. As at box 59 in FIG. 4 the micro-processor then records in the memory 25 the calibration value of each denomination of note and coin to be used. As each denomination is calibrated, the micro-processor instructs the operator to calibrate the next quantity by showing a display such as at FIGS. 3(B) to 3(D), including the appropriate denomination. At the end of each calibration the micro-processor poses the question "Have all denominations been calibrated?" as at block 60. If the answer is NO, the routine returns to block 58 to continue the calibration, and if the answer is YES the routine moves to block 61 which represents the weighing routine. This weighing routine is shown in detail in FIG. 5 and will be described hereinafter. In order to move to the weighing routine the operator must respond to a display shown in FIG. 3(Q) and generated as at block 60'. The response to this display is to move switch 6 to position 1, as shown in FIG. 3. The initiation of the weighing routine is that the display of FIG. 3(Q) is shown to the operator and that after he has put switch 6 to "1" he must select the denomination and grade of money which he wishes to weigh. Firstly the button 7 or 8 appropriate to note or coin is held down, and the computer circuitry progresses automatically through the various denominations of note or coin available, and these are indicated until the button is released, whereupon a required denomination has been selected. The button 9 is then operated for setting up the apparatus for use with a new or used grade of note, the display again processing through the two or more grade states until the button 9 is released and the appropriate grade is indicated.

Thus for the operator to bring the apparatus to the beginning of the weighing routine, he has first to calibrate the apparatus by use of the button 10, and has then to set the required denomination and grade of money by use of the buttons 7, 8 and 9. The apparatus will then automatically produce by the weighing routine a display of any amount of money of the correct denomination and grade which is placed on the platter 4.

Returning now to the flow chart of FIG. 4, at the end of the weighing routine in box 61, the micro-processor interrogates the keyboard 26 to see if an instructions has been made to use a tare routine to take account of a wrapper of a bundle of notes or a bag containing coins. The interrogation is shown at box 62' in FIG. 4. The instructions to include the tare routine is made by pressing the calibration button 10 when the switch 6 is in the "1" position.

If an instruction for tare has been made, the routine passes to a Tare sub-routine in box 63' which operates in the following manner. The operator places on the pan a wrapper or bag of the type which is to be used; the normal weighing operation is made and the computing means stores the weight of the bag or wrapper; the operator leaves the bag or wrapper on the pan and adds the quantity of coins or notes to be weighed together with the bag or wrapper containing the coins or notes; the computing means effects the normal weighing sequences as have been described except that at the Tare routine 63' the computing means subtracts twice the previously memorized weight of the bag or wrapper from the weight of coins or notes being considered. This takes account of the bag or wrapper left from the tare weighing step, and the weight of the bag or wrapper surrounding the coins or notes being weighed.

After the tare routine, the micro-processor interrogates the keyboard 26 (at box 62) to see if the button 11 has been depressed after the display in the window 5 of the value of money weighed. If the answer is NO the micro-processor moves to the next interrogation box 64. If the answer to the question at the block 62 is YES, the micro-processor moves to the block 63 which defines the function that the displayed value should be added to a part of the micro-processor memory set aside as a value store. Next the routine moves to question block 64 at which the micro-processor interrogates the keyboard 26 to determine if the "=" button 12 has been pushed. If the answer is NO the routine returns to the weighing routine 61, but if the answer is YES the routine moves to block 65 and the micro-processor displays from the value store in its memory the total value so far entered into that store. The routine then moves to the question block 66 and the micro-processor interrogates the keyboard 26 to see if the button 12 has been pressed a second time in response to the display of total stored value. If the answer is NO the routine returns to the weighing routine 61, but if the answer is YES the routine moves to the function block 67 and the micro-processor performs the function of clearing the store and displaying zero. After clearing the store the routine again returns to the weighing routine with the store empty.

There will now be described with reference to the flow diagram of FIG. 5, the weighing routine by which the micro-processor is programmed to obtain the value of an unknown quantity of bank notes or coin placed upon the platter 4 of the weighing means 1 after the apparatus has been correctly set up as described. The weighing routine begins at the block 40 by the micro-processor accepting the weight reading from the ADC 23, and the routine proceeds to the block 41 at which the zero error previously stored is subtracted from the weight reading from the ADC. The zero error is the ADC reading with nothing on the platter 4. Therefore the routine subtracts the zero error from the weight reading to obtain the weight of whatever is on the pan.

Next the routine passes to the question block 42 at which the micro-processor puts the question as to whether the weight signal is greater than half that of the lightest note to be weighed. If the answer is NO the routine passes to block 43 at which the micro-processor revises the zero error by adding to the stored zero error the net weight shown from the ADC at block 41. Thus at the block 43 the micro-processor re-adjusts the zero error to allow for zero drift. This is based on the decision taken at the decision box 42 which is that if the ADC weight is less than half the weight of the lightest note, then the weighing pan is empty.

From the block 43 the routine proceeds to block 44 at which the micro-processor reviews a correcting item which will be referred to as the "stacking correction" and sets this to zero. The significance of the stacking correction will be described hereinafter with reference to the other side of the weighing routine of FIG. 5 which results from a YES at the question box 42. Similarly the routine then proceeds to block 44' at which the micro-processor sets to zero a term M' which represents a number of notes which have been weighed, and which number has been stored for future use as will be described hereinafter with reference to the right hand side of the flow chart of FIG. 5.

Next the left hand side of the routine of FIG. 5 proceeds to the block 45 at which the micro-processor instructs the display driver 27 to display the denomination of money being handled and the grade, as shown for example at FIG. 3(E). Thus the effect of this branch of the weighing routine is that the decision is reached that there is nothing on the weighing pan, the zero error and stacking correction are reset, and the routine is returned to the decision box 62' in FIG. 4 from which it returns to the beginning of the weighing routine (assuming that, as will normally be the case, the button 11 has not been pressed when there is nothing on the pan).

The branch of the flow diagram of FIG. 5 to the right of the question block 42 constitutes the main sequence embodying the present invention. The commencement of this sequence pre-supposes that there has already been stored in the memory 25 a unit weight of a note or coin of the denomination being measured, which has been obtained by dividing the calibration quantity of notes or coins by the known number of notes or coins during the calibration routine already described. It is also pre-supposed that there is stored in the memory 25 a modifying factor for each grade which may be chosen other than "new" in respect of notes. The purpose of this modifying factor is to multiply the "calibration" unit weight of a new note to give a new "calibration" average unit weight for a used note. No such modifying factor is required in the case of coins, since the weight of coins do not change appreciably with use, and the modifying factor in respect of notes need not be brought into play when the machine is set by the grade button 9 in FIG. 3 for measuring new notes. Thus the grade modifying factor is stored in the memory for use when necessary, and is only brought into play when used notes are to be measured. In its simplest form the grade button 9 of FIG. 3 effects a selection between only 2 grades, namely new notes or used notes, but if necessary the computer can be programmed to store more than one modifying factor for any particular denomination of notes, for example a modifying factor for a normally used note, and a further modifying factor for heavily used notes which are unfit for further recirculation in the banking system. The following description will be made only with respect to measuring new or used notes, or coins, for simplicity. It is also to be appreciated that it will often be convenient to provide different modifying factors for each denomination of notes, since different types of notes change weight to differing degrees, depending upon the quality of the paper. Conveniently the modifying factor applied may be a multiplying factor of 1.027 for low denomination notes such as 1 notes and $1 dollar notes; 1.020 for 10 notes, and 1.015 for 20. Conveniently the computer is programmed so that the correct modifying factor is selected for used notes of a particular denomination, by the micro-processor interrogating the keyboard 26 or memory 25 to determine the denomination being considered, and the grade entered in, and then selecting the correct modifying factor.

Returning now to consideration of the routine of FIG. 4, if the answer at the question block 42 is YES, i.e. the weight signal from block 41 is greater than half that of the lightest note, the micro-processor assumes that a quantity of notes to be determined has been placed on the platter 4, and the routine proceeds to block 46. At block 46 the micro-processor retrieves from the memory the correct calibration weight of 100 of the denomination of coins or notes being measured, and interrogates the keyboard or memory to determine whether a used grade of notes has been selected by the buttons 8 and 9. If this is the case, the micro-processor multiplies the calibration weight of the selected denomination by the appropriate modifying factor for a used note, to provide a dividing factor (referred to as CAL) which represents 100 times the average unit weight of a used note. If new notes or coins are concerned, CAL equals merely 100 times the appropriate unit weight of the denomination.

The routine then proceeds to block 47 where the micro-processor calculates a quotient N which equals the weight of the unknown quantity of notes provided from block 41 multiplied by 100 and divided by the adjusted calibration weight CAL which is the calibration weight for the selected denomination multiplied by the modifying factor as appropriate. It will be appreciated that the effect of this step is to divide the weight of the unknown quantity of bank notes by the average unit weight of a note. The result of the function at block 47 is to provide a number which will normally not be a whole number.

Next the routine passes to block 49 at which the micro-processor interrogates the keyboard 26 to determine whether the Coin button 7 or the Note button 8 has been pressed. If the coin button 7 has been pressed, the routine passes to the block 49' where the microprocessor carries out the function of rounding the quotient N to the nearest whole number, whether rounded up or down, and this whole number is represented by M. The routine then passes to block 50 at which the micro-processor determines the value of the money weighed by multiplying the whole number M by the appropriate denomination. The routine then passes to block 51 in which the micro-processor instructs the display driver 27 (FIG. 2) to display at the display unit 28 the value and grade of the sum of coins weighed. After block 51 the weighing routine exits to the decision box 62' in the main routine of FIG. 5.

Returning now to the interrogation box 49 of FIG. 5, if the note button 9 on the keyboard 25 (FIG. 3) has been pressed the routine of FIG. 5 moves to a sub-routine 48 shown in FIG. 6 for performing a stacking correction where a series of combined additions are made.

Referring to FIG. 6, the routine passes to block 48A where an adjusted quotient N' is calculated by subtracting from the unadjusted quotient N a stacking correction which is represented by G. The stacking correction is used to improve the accuracy of operations where a series of notes or coins are added to the platter one after the other and are measured in turn and in total, and the operation of the stacking correction will be described more fully hereinafter. In connection with this initial description of the routine of FIG. 6, it is assumed that the quantity of notes or coin being measured is the first quantity to be placed on the platter 4, so that the stacking correction G is zero (at block 44 in FIG. 5). In such a case the adjusted quotient N' and the unadjusted quotient N are identical.

Also within the block 48A the micro-processor carries out the function of rounding the adjusted quotient N' to the nearest whole number, whether rounded up or down, and this nearest whole number is represented by M.

Next the routine passes to block 48B in which the micro-processor calculates the deviation of the nearest whole number M from the adjusted quotient N', and this deviation later becomes the stacking correction G' (as described hereinafter with reference to block 48K) for any subsequent quantity of money which is added to the quantity already present on the platter 4. The deviation G' can be regarded as the error between the adjusted quotient N' and the nearest whole number M. By way of explanation, if a number of notes each having a weight perfectly equal to the average unit weight of unused notes, were to be weighed, and this were to be the first quantity of notes to be placed on the platter 4, then the unadjusted quotient N would equal the adjusted quotient N', since there would be not stacking correction G, and also the nearest whole number M would be identical to the quotient N' and there would be no new stacking correction G to pass on to the next weighing operation.

After the block 48B, the routine then passes to block 48C, and in this block the micro-processor examines the deviation G' between the adjusted quotient N' and its nearest whole number M to determine whether this deviation lies between plus and minus 0.35. If the deviation G' lies between plus and minus 0.35 the routine passes to block 48E, but if the deviation G' lies outside the range plus or minus 0.35 the routine passes to block 48D and displays the inhibited value display which is shown in FIG. 3(P). The purpose of this is to give a warning that no reliable value can be placed on the money which has been put on the weighing platter 4. After this display the routine moves from block 48D again to the decision box 62' in the main routine of FIG 4.

Referring to FIG. 6, if at the question box 48C the deviation G' is found to be between ±0.35 the routine passes to question box 48E at which the micro-processor examines a previously stored term M' (which represents the number of notes found to be on the pan at the last weighing operation) and compares M' with the rounded quotient M from the box 48A. The essence of this step at box 48E is to determine whether a fresh quantity of notes has been added to the pan, or whether the apparatus is considering again the same quantity of notes. If the answer at the box 48E is NO, the routine passes to box 48F, at which the existing number of notes term M' is set equal to M (i.e. is updated). The routine then passes to box 48G at which a stacking counter is set to 5, which is its maximum. The sub-routine of FIG. 6 then exits to the box 50 in FIG. 5.

If at the question box 48E in FIG. 6 the answer is YES, the routine passes to box 48H at which the stacking counter (referred to with regard to box 48G) is decremented by 1 unit, and the routine then passes to question box 48J where the stacking counter condition is examined to see whether it has been decremented to zero. If the stacking counter is not at zero, the sub-routine exits to box 50 in FIG. 5 and the weighing cycle is repeated. If the stacking counter is at zero, the routine proceeds from the box 48J to the box 48K at which the stacking correction is updated in the computing means memory by adding G and G' together to give the new, current stacking correction. The sub-routine then exits to box 50 in FIG. 5.

It will be appreciated that the effect of the routine of boxes 48E and 48K in FIG. 6, is that at each weighing cycle, the computing means tests to see whether a new amount of money has been placed on the pan 4, and then tests to see if a consistent value for the number of notes is obtained during five successive weighing cycles, before the stacking correction is updated. The purpose of this is to avoid hunting which may occur if the computing means attempts to update the stacking correction at each weighing cycle, due to slight disturbances which may effect the weight reading from the ADC.

Returning now to consideration of FIG. 5, at block 50, the micro-processor determines the value of the money weighed by multiplying the whole number M by the appropriate denomination, e.g. 5 or 1 and so on.

The routine then passes to block 51 in which the micro-processor instructs the display driver 27 (FIG. 2) to display at the display unit 28 the value and grade of the sum of money weighed. After block 51 the weighing routine exits to the decision box 62' in the main routine of FIG. 4.

Returning now to consideration of the effect of the stacking correction G in the weighing routine, there will be considered the case where an unknown quantity of used notes has been weighed and the routine of FIG. 5 has passed through the blocks 41, 42, 46, 47, 49, 48, 50 and 51, and there has been stored a stacking correction G' obtained from block 48. If the operator then wishes to add a further quantity of notes of the same denomination and grade to the notes already on the platter 4, but does not wish to retain a record of the value of the first set of notes separately from the combined quantities of the two sets of notes, the operator will not push the button 11 after the display of the value of the first quantity of notes, and the micro-processor will return from question block 64 in FIG. 4 to the weighing routine 61. The operator will then add the second unknown quantity of used bank notes to the platter 1 and the weight reading will be provided by the routine passing through blocks 40, 41 and 42 of FIG. 5 to block 46. At block 46 the micro-processor will produce the operating factor CAL by selecting the calibration weight of the selected denomination and multiplying this by the modifying factor for the selected grade of note, and in block 47 the micro-processor will calculate a quotient N for the new total weight on the platter 4 by multiplying this by 100 and dividing the product by CAL. The routine then passes to block 48A which is shown in FIG. 6.

Referring to FIG. 6, in block 48A the micro-processor will withdraw from memory the stacking correction G from the previous weighing operation of the first quantity of notes (i.e. the deviation of the first adjusted quotient N'1 from its nearest whole number M) and will subtract this stacking correction G from the new quotient N relating to the combined quantities on the platter 4. Next the micro-processor at block 48A will produce a new whole number M by rounding the new adjusted quotient N' to the nearest whole number, and will also produce a new stacking correction G' by subtracting the new whole number M from the new adjusted quotient N'. It will be appreciated that the effect of the functions in the block 48 is to remove from the deviation of the new quotient N from its nearest whole number M the effect of the previous deviation G of the first quotient N (related to the first quantity placed on the platter 4) from the nearest whole number M previously calculated for that previous quantity of notes.

The routine then passes to the block 48B in the same way as has been described previously, and it is the adjusted deviation G' which is checked at block 48B to see whether it falls within the range plus or minus 0.35. Provided that the adjusted deviation G' falls within that range, the routine then passes through the hunting-prevention routine of blocks 48E to 48K to the blocks 50 and 51 of FIG. 5 and the total value of the notes on the platter 4 is displayed. After the weighing routine has passed through five successive confirming cycles, the new adjusted deviation G' is added to the existing deviation G to create the new stacking correction and is stored in memory by the function of block 48K (FIG. 6).

The effect of the use of the stacking correction as described, is that a more accurate determination can be made as to whether an acceptable value can be calculated for an unknown quantity of notes, by dividing the quantity of notes into two or more quantities, and weighing each of the quantities in a cumulative series, rather than by conducting a single weighing operation. By way of example of the effect of the stacking correction, there will be considered a case where two quantities of one hundred pound notes are to be weighed together. In the example, the weights of the two bundles of one hundred used notes are as follows:

Bundle A of one hundred used 1 notes: 100.31w
Bundle B of one hundred used 1 notes: 100.29w
Combined Bundles A and B: 200.60w (where w equals the average unit weight of a used 1 note).

If the two bundles were placed together on the platter 4 and the weighing routine were followed as a single operation, the quotient N at block 47 would be 200.60, and the adjusted quotient N' at block 48 would also be 200.60, since there would be no stacking correction from preceding operation. The nearest whole number N would be 201 and the deviation G' would be −0.40. This would result in a NO signal produced at the block 48C which would lead to display of a warning signal by the function of block 48D to indicate that a reliable value of notes could not be given.

Considering now the case where the two bundles are weighed separately but cumulatively, if bundle A is placed on the platter 4, the quotient N at block 47 is calculated as 100.31 and the adjusted quotient N' calculated at block 48 is also 100.31 since there is no stacking correction from a previous operation. The nearest whole number M is 100, and the deviation G' is 0.31. This deviation G' at block 48C results in a YES so that the value of the notes weighed is correctly shown by the function of block 51 as 100. The operator does not press button 11 and the micro-processor returns to the weighing routine from the block 62 in FIG. 4.

The operator then places bundle B on the platter 4 and the weighing routine of FIG. 5 passes to block 47 where the new quotient N for the combined bundles is calculated as 200.60. In the sub-routine of FIG. 6, at block 48A, the new adjusted quotient N' is calculated by subtracting from the new quotient N of 200.60 the stacking correction G of 0.31 which has been stored from the previous operation. This gives an adjusted quotient N' of 200.29 and a new deviation G' of 0.29 is calculated. The routine then passes to block 48C where the new deviation G' of 0.29 results in a YES so that the routine passes through blocks 48E to 48K, to blocks 50 and 51, to correctly display the total value of 200 for the combined bundles A and B. After five confirming weighing cycles, at block 48 (FIG. 6) the new deviation G' is added to the existing stacking correction G to produce the new stacking correction G of 0.60 which is stored in the memory 25 in place of the previous stacking correction of 0.31.

Thus it will be appreciated that the stacking correction routine shown in FIG. 6 enables large quantities of notes to be weighed and their value determined more accurately by dividing them into succeeding bundles of smaller numbers of notes which are then added together cumulatively by the process described.

Returning now to the main routine of FIG. 4, the blocks which follow after the weighing routine 61 enable correctly indicated values of notes weighed to be dealt with in different manners by the operator. If after the display is shown at the successful end of a weighing routine, the operator does not press button 11, the routine returns to the weighing routine from the question box 64. If on the other hand the operator presses the button 11, the routine passes to block 63 where the micro-processor adds the displayed value to any preceding totals which have been entered into a store register in the memory 25. This having been done the operator may or may not press the button 12. If the button 12 is not pressed the routine returns to the weighing routine 61 for further operations. If the button 12 is pressed the routine passes to box 65 where the micro-processor instructs the display driver 27 to display at the display unit 28 the total stored value of values which have been entered into the store register in the memory 25. After this the operator can again press or not press the button 12, as at the question box 66. If the button 12 is not pressed the routine returns to the weighing routine 61, and the total of values in the store register remains. If the button 12 is pressed, the routine passes to block 67, in which the micro-processor clears the store and displays zero, and then returns to the weighing routine 61.

It will be appreciated that where, for example, 1 notes are being weighed, the display at 5 is in fact a display of the number of notes, in addition to being a display of the money value. If in any particular circumstance only the number of notes is desired, the computing means can be programmed to multiply the whole number M at the block 50 in FIG. 5 by unity.

There will now be set out a number of preferred parameters of operation and types of equipment which may be utilised in an apparatus embodying the invention.

Individual bank note weights to be weighed may be in the range of 0.5 to 1.5 gm each, and coin weights may be in the range 1.5 to 15 gm each. The range of counting may for example be 0 to 150 items at a single weighing. As has been mentioned, the "rejection" band by the computing means should be operated for counts of notes, but need not be operated for coins since the weight variations of the coins are not sufficient to cause error within the number of coins counted. Recalibration of the device should be carried out twice in a working day, but zero tracking occurs automatically when nothing is placed in the weighing pan.

Conveniently the weighing means includes a load cell having a capacity of 5 kg and non linearity better than 0.015%, being a full active bridge construction with temperature compensation. A load cell amplifier may be provided taking a signal in the range 0 to about 1 1 mV for notes or 10 mV for coins and amplifying it sufficiently for analogue to digit conversion (i.e. input range of 200 mV to 1 v).

The analogue to digital convertor providing the interface between the weighing means and the computing means may be an integrating convertor (usually binary coded decimal) intended for digital volt meters and similar applications, and a convenient A/D convertor may be the MC14433.

The computing means is conveniently based on a micro-processor system, which is required to perform main tasks as follows:

(1) Obtain the multiplexed A/D convertor reading of weight and demultiplex it into four digit BCD value.
(2) Drive a number of liquid crystal displays to show the number of notes, grade of note etc.
(3) Scan a number of push buttons.
(4) Perform six digit BCD arithmetic including multiplication and division in order to calculate a number of notes.
(5) Control and time the sequence of operation.

A suitable micro-processor is the Intel 8048 series, model 8039/8049.

By way of example the software may comprise basically the following:

1. A set of BCD arithmetic routines, for add, subtract, divide and multiply accurate to six figures.
2. A timer interrupt routine to scan the switches.
3. A routine to take a weight value by freezing the A/D convertor and reading the output. This is to be used as a correction if the pan is empty or added to the correction during a weighing.
4. A routine invoked by the "calibrate" button which records the corrected weight during a calibrate phase.
5. A routine which repeatedly reads the pan weight and corrects it.
6. A routine to divide the weight obtained in item 5 by 1/100th of the weight obtained in item 4 to obtain the number of "notes".
7. A routine to decide whether to display this number or report an error due to a non-integral number of notes.

Consideration will now be given again to various further general aspects of the invention. Although the invention has been set out with reference to means for comparing the said quotient with the nearest ideal quotient, deriving from the ideal quotient a signal indicating the number and/or value of articles weighed and generating a warning signal in certain circumstances, it is to be appreciated that in some aspects the invention may provide improved features of apparatus and method independent of the main features set out.

Thus in accordance with another aspect of the invention there is provided apparatus for measuring the number and/or value of an unknown quantity of articles which have been subjected to use or other modifying process, comprising weighing means for weighing an unknown quantity of the articles, and processing means, said processing means being arranged for entering an average weight factor related to an average unit weight of the articles to be measured, and means for dividing the total weight of the weighed articles by the average weight factor to provide a signal indicating the number and/or value of the quantity of articles weighed, in which the means for entering the said weight factor of the articles to be measured comprises means for entering an average weight factor of articles of the same type as the articles to be measured but before being subjected to the said modifying process, and means for multiplying the weight factor of the unmodified articles by a modifying factor to give an average weight factor of a modified article.

Conveniently the said means for entering the said average weight factor of the articles to be measured comprises means for receiving from the weighing means a total weight of a known quantity of articles of the same type as the modified articles but before being subjected to the modifying process, and for dividing that total weight by the known number of articles to give an average unit weight of the unmodified articles.

In accordance with a further aspect of the present invention there is provided a method of measuring the number and/or value of an unknown quantity of articles which have been subjected to use or other modifying process, the method comprising entering into a weighing and processing apparatus a record of an average weight factor related to an average unit weight of the articles to be measured, weighing an unknown quantity of the articles, and dividing the total weight of the weighed articles by the said weight factor to give an indication of the number and/or value of the quantity of articles weighed, in which the step of entering the said average weight factor of the articles to be measured comprises entering an average weight factor of articles of the same type as the modified articles but before being subjected to the said modifying process, and multiplying the average weight factor of the unmodified articles by a modifying factor to give an average weight factor of a modified article.

Conveniently the said step of entering the said average weight factor of the articles to be measured includes the step of weighing a known quantity of articles of the same type as the modified articles but before being subjected to the modifying process, and dividing the total weight of the unmodified articles by the known number of articles to give an average unit weight of an unmodified article.

I claim:

1. A method of measuring the number and/or value of an unknown quantity of articles by use of a weighing and processing apparatus comprising:
   entering into the weighing and processing apparatus a record of an average weight factor related to an average unit weight of the articles to be measured;
   weighing an unknown quantity of articles;
   dividing the total weight of the weighed articles by the said average weight factor to give an actual quotient;
   comparing the actual quotient with the nearest ideal quotient to determine whether the actual quotient differs from the nearest ideal quotient by more or less than a predetermined deviation;
   as a result of the outcome of the comparison step, carrying out at least one of the following steps, namely
   if the actual quotient differs from the nearest ideal quotient by less than a predetermined deviation, the step of indicating the number and/or value of the quantity of articles weighed by means of a signal derived from the said nearest ideal quotient, and
   if the actual quotient differs from the nearest ideal quotient by more than the predetermined deviation, the step of indicating a warning that a reliable number and/or value of the quantity of articles weighed cannot be given;
   storing in the weighing and processing apparatus information relating to the said unknown quantity of articles,
   adding to the said unknown quantity of articles a further unknown quantity of articles, and
   repeating in respect of the combined unknown quantities of articles the weighing, dividing, comparing and indicating steps set out above to provide a new actual quotient, but adjusting the items concerned in the comparison step so as to remove from the deviation of the new actual quotient from its nearest ideal quotient the effect of the previous deviation of the first mentioned actual quotient from its nearest ideal quotient.

2. A method of measuring the number and/or value of an unknown quantity of articles by use of a weighing and processing apparatus comprising:
   entering into the weighing and processing apparatus a record of an average weight factor related to an average unit weight of the articles to be measured;
   weighing an unknown quantity of articles;
   dividing the total weight of the weighed articles by the said average weight factor to give a first actual quotient;

comparing the first actual quotient with the nearest ideal quotient to determine whether the first actual quotient differs from the nearest ideal quotient by more or less than a predetermined deviation;

as a result of the outcome of the comparison step, carrying out at least one of the following steps, namely if the first actual quotient differs from the nearest ideal quotient by less than a predetermined deviation, the step of indicating the number and/or value of the quantity of articles weighed by means of a signal derived from the said nearest ideal quotient, and if the first actual quotient differs from the nearest ideal quotient by more than the predetermined deviation, the step of indicating a warning that a reliable number and/or value of the quantity of articles weighed cannot be given;

storing in the weighing and processing apparatus a record of the said deviation of the first actual quotient from its nearest ideal quotient, adding to the first mentioned unknown quantity of articles the further unknown quantity of articles, weighing the new total unknown quantity of articles, dividing the new total weight by the said average weight factor to give a new actual quotient, reducing the deviation of the new actual quotient from its nearest ideal quotient by the said stored deviation to give an adjusted new actual quotient, comparing the adjusted new actual quotient with its nearest ideal quotient to determine whether the adjusted new actual quotient differs from its nearest ideal quotient by more or less than a predetermined deviation, and as a result of the outcome of the comparison step, carrying out at least one of the following steps, namely if the new adjusted actual quotient differs from its nearest ideal quotient by less than a predetermined deviation, the step of deriving from the said ideal quotient nearest the new adjusted actual quotient a signal representative of the number and/or value of the total combined quantities of articles by means of a signal derived from the said nearest ideal quotient, and if the new adjusted actual quotient differs from its nearest ideal quotient by more than the predetermined deviation, the step of indicating a warning that a reliable number and/or value of the total combined quantities of articles cannot be given.

3. A method according to claim 2 in which the said average weight factor consists of the average unit weight of the articles.

4. A method according to claim 2 in which the said nearest ideal quotient consists of the nearest whole number to the actual quotient being compared.

5. A method according to claim 2 in which if the said actual quotient differs from the said nearest ideal quotient by more than the predetermined deviation, no number or value of the quantity of articles is indicated.

6. A method according to claim 2 including the step of indicating the number and/or value of the articles being measured by a visual indicating means.

7. A method according to claim 2 including the step of generating a signal indicating the value of the quantity of articles weighed by multiplying the said ideal quotient which is nearest to the said actual quotient by a value factor related to the value of each article.

8. A method according to claim 2 including the step of generating an audible warning if the said actual quotient differs from the said nearest ideal quotient by more than the said predetermined deviation.

9. A method of measuring by use of a weighing and processing apparatus the number and/or value of an unknown quantity of articles which have been subjected to a modifying process, comprising:

entering into the weighing and processing apparatus a record of an average weight factor related to an average unit weight of the articles to be measured, said step of entering said average weight factor comprising entering an average weight factor of articles of the same type as the modified articles but before being subjected to the said modifying process, and multiplying the average weight factor of the unmodified articles by a modifying factor to give an average weight factor of a modified article;

weighing an unknown quantity of articles;

dividing the total weight of the weighed articles by the said average weight factor to give an actual quotient;

comparing the actual quotient with the nearest ideal quotient to determine whether the actual quotient differs from the nearest ideal quotient by more or less than a predetermined deviation; and as a result of the outcome of the comparison step, carrying out at least one of the following steps, namely if the actual quotient differs from the nearest ideal quotient by less than a predetermined deviation, the step of indicating the number and/or value of the quantity of articles weighed by means of a signal derived from the said nearest ideal quotient, and if the actual quotient differs from the nearest ideal quotient by more than the predetermined deviation, the step of indicating a warning that a reliable number and/or value of the quantity of articles weighed cannot be given.

10. A method according to claim 9 in which the said step of entering an average weight factor of articles of the same type as the articles to be measured but before being subjected to the said modifying process comprises weighing a known quantity of articles of the same type as the modified articles but before being subjected to the modifying process or weighing an item representing such a known quantity, and dividing the total weight of the unmodified articles or representative item by a number related to the said known number of articles to give an average weight factor of unmodified articles.

11. A method according to claim 10 when the articles to be measured consist of used bank or like notes, in which the said modifying factor lies in the range 1.01 to 1.03.

12. A method according to claim 11 in which the said modifying factor is about 1.027 for low denomination bank notes.

13. A method of measuring the number and/or value of an unknown quantity of used bank notes or like notes by use of a weighing and computing apparatus, comprising the steps of weighing a known quantity of unused bank notes or equivalent substitute notes, dividing the total weight of the unused notes by the known number of notes to give a unit weight of an unused note, multiplying the resulting unit weight of an unused note by a modifying factor to give an average unit weight of a used note, weighing an unknown quantity of used notes, dividing the total weight of the used notes by the said average unit weight of a used note, comparing the quotient with the nearest whole number to determine whether the quotient differs from the nearest whole number by more or less than a predetermined deviation, said predetermined deviation having a value selected to lie in the range greater than 0.3 and less than 0.4, and as a result of the outcome of the comparison step, carrying out at least one of the following steps, namely if the quotient differs from the nearest whole number by less than a predetermined deviation, the step of indicating the number and/or value of the quantity of used notes weighed by means of a signal derived from the said whole number, and if the quotient differs from the nearest whole number by more than the predetermined deviation, the step of indicating a warning that a reliable output number and/or value for the quantity of used notes weighed cannot be given.

14. A method according to claim 13 in which the said predetermined deviation is about 0.35.

15. Apparatus for measuring the number and/or value of an unknown quantity of articles comprising:

weighing means for weighing an unknown quantity of articles and for generating signals representative of the weight measured by said weighing means;

processing means connected to receive said signals from said weighing means representative of said weight measured by said weighing means; and indicator means connected to an output of said processing means for indicating the information content of output signals of said processing means;

said processing means comprising means for dividing the total weight of the weighed articles by an average weight factor related to an average unit weight of the articles which has been previously entered into said apparatus, said dividing means of providing a first actual quotient equal to said total weight divided by said average weight factor;

means for comparing the actual quotient with the nearest ideal quotient, to determine whether the actual quotient differs from said nearest ideal quotient by more or less than a predetermined deviation;

means for deriving from said nearest ideal quotient a signal representative of the number and/or value of said quantity of articles weighed;

means for generating a warning signal if said quotient differs from the said nearest ideal quotient by more than the predetermined deviation; and means for storing information relating to said first mentioned unknown quantity of articles weighed for which said total weight, actual quotient, and deviation have been determined, said weighing means being arranged for weighing a further total weight of a combination of said first unknown quantity of articles and a second unknown quantity of articles subsequently added to said first quantity, said processing means being arranged for repeating with regard to the combined weight of said first and second quantities of articles the steps carried out with regard to the weight of said first quantity, and being arranged to adjust the items concerned in the quotient comparison so as to remove from the deviation of the new actual quotient from its nearest ideal quotient the effect of the previous deviation of the first actual quotient from its nearest ideal quotient.

16. Apparatus for measuring the number and/or value of an unknown quantity of articles comprising:

weighing means for weighing an unknown quantity of articles and for generating signals representative of the weight measured by said weighing means;

processing means connected to receive said signals from sa d weighing means representative of said weight measured by said weighing means; and indicator means connected to an output of said processing means for indicating the information content of output signals of said processing means;

said processing means comprising:

means for dividing the total weight of the weighed articles by an average weight factor related to an average unit weight of the articles which has been previously entered into said apparatus, said dividing means providing a first actual quotient equal to said total weight divided by said average weight factor;

means for comparing the actual quotient with the nearest ideal quotient to determine whether the actual quotient differs from said nearest ideal quotient by more or less than a predetermined deviation;

means for deriving from said nearest ideal quotient a signal representative of the number and/or value of said quantity of articles weighed;

means for generating a warning signal if said quotient differs from the said nearest ideal quotient by more than the predetermined deviation;

means for storing said deviation of said first actual quotient from its nearest ideal quotient;

means for dividing the new total weight of the combined quantities by said average weight factor;

means for reducing the deviation of the new actual quotient from its nearest ideal quotient by said stored deviation;

means for comparing the adjusted new actual quotient with its nearest ideal quotient to determine whether the adjusted new actual quotient differs from the nearest ideal quotient by more or less than a predetermined deviation;

means for deriving from said ideal quotient nearest to said new actual quotient a signal representative of the number and/or value of the total combined quantities of articles weighed; and means for generating a warning signal if said adjusted new actual quotient differs from its said nearest ideal quotient by more than the predetermined deviation.

17. Apparatus according to claim 16 in which said average weight factor consists of the average unit weight of the articles.

18. Apparatus according to claim 16 in which said nearest ideal quotient consists of the nearest whole number to the actual quotient being compared.

19. Apparatus according to claim 16 in which said indicator means comprises means for indicating the number and/or value of the quantity of articles weighed as provided by said signal derived from said nearest ideal quotient.

20. Apparatus according to claim 19 in which said processing means includes means for actuating said indicator means to indicate said number and/or value only if the said actual quotient differs from said nearest ideal quotient by less than said predetermined deviation.

21. Apparatus according to claim 16 in which said processing means includes means for generating a signal indicating the value of said quantity of articles weighed by multiplying said ideal quotient which is nearest to the said actual quotient by a value factor related to the value of each article.

22. Apparatus according to claim 16 in which said indicator means comprises visual indicating means for indicating the number and/or value of the articles being measured.

23. Apparatus according to claim 16 in which said indicator means includes means for generating an audible warning if said actual quotient differs from said nearest ideal quotient by more than said predetermined deviation.

24. Apparatus according to claim 16 in which the said processing means comprises a computer.

25. Apparatus for measuring the number and/or value of an unknown quantity of articles which have been subjected to a modifying process, comprising:
    weighing means for weighing an unknown quantity of articles and for generating signals representative of the weight measured by said weighing means;
    processing means connected to receive said signals from said weighing means representative of said weight measured by said weighing means; and
    indicator means connected to an output of said processing means for indicating the information content of output signals of said processing means;
    said processing means comprising:
    means for entering into the apparatus an average weight factor related to an average unit weight of the articles, said means for entering the said average weight factor of the articles to be measured comprising means for entering an average weight factor related to an average unit weight of articles of the same type as the articles to be measured but before being subjected to the said modifying process, and means for multiplying the weight factor of said unmodified articles by a modifying factor to give an average weight factor of a modified article;
    means for dividing the total weight of the weighed articles by said average weight factor to provide an actual quotient equal to said total weight divided by said average weight factor;
    means for comparing the actual quotient with the nearest ideal quotient, to determine whether the actual quotient differs from said nearest ideal quotient by more or less than a predetermined deviation;

means for deriving from said nearest ideal quotient a signal representative of the number and/or value of said quantity of articles weighed; and
    means for generating a warning signal if said quotient differs from the said nearest ideal quotient by more than the predetermined deviation.

26. Apparatus according to claim 25 in which
    said means for entering an average weight factor of articles of the same type as the articles to be measured but before being subjected to the said modifying process comprises
    means for receiving from the weighing means a signal representing a total weight of a known quantity of articles of the same type as the modified articles but before being subjected to the modifying process, and
    means for dividing that total weight by a number related to the said known number of articles to give an average weight factor of the unmodified articles.

27. Apparatus according to claim 25 in which the apparatus is arranged for measuring the number and/or value of an unknown quantity of used bank notes or like notes, and in which the said modifying factor lies in the range 1.01 to 1.03.

28. Apparatus according to claim 27 in which the said modifying factor is about 1.027 for low denomination bank notes.

29. Apparatus for measuring the number and/or value of an unknown quantity of used bank notes or like notes comprising:
    weighing means for weighing an unknown quantity of notes;
    processing means connected to receive from the weighing means signals representative of the weight measured by the weighing means; and
    indicator means connected to an output of said processing means for indicating the information content of output signals of the said processing means, said processing means comprising:
    means for dividing the total weight of said weighed articles by an average unit weight of said articles previously entered in said apparatus to give a quotient;
    means for comparing the quotient with the nearest whole number to determine whether said quotient differs from said nearest whole number by more or less than a predetermined deviation, said predetermined deviation having a value selected to lie in the range greater than 0.3 and less than 0.4;
    means for deriving from said whole number a signal representative of the number and/or value of the quantity of articles weighed; and
    means for generating a warning signal if said quotient differs from said nearest whole number by more than said predetermined deviation.

30. Apparatus according to claim 29 in which said predetermined deviation is about 0.35.

* * * * *